(12) United States Patent
Huang (10) Patent No.: US 8,147,126 B2
(45) Date of Patent: Apr. 3, 2012

(54) COVERING STRUCTURE OF A MIXER

(75) Inventor: Kun-Chung Huang, Dali (TW)

(73) Assignee: Spar Food Machinery Mfg. Co., Ltd., Dali (TW)

( * ) Notice: Subject to any disclaimer, the term of this patent is extended or adjusted under 35 U.S.C. 154(b) by 535 days.

(21) Appl. No.: 12/359,411

(22) Filed: Jan. 26, 2009

(65) Prior Publication Data

US 2010/0188928 A1  Jul. 29, 2010

(51) Int. Cl.
  *B01F 15/00* (2006.01)
(52) U.S. Cl. .................................. 366/347; 366/331
(58) Field of Classification Search .................. 366/347, 366/331, 349, 601, 206, 207
  See application file for complete search history.

(56) References Cited

U.S. PATENT DOCUMENTS

| 5,306,083 | A | 4/1994 | Caldwell et al. |
| 6,068,398 | A | 5/2000 | Lin |
| 6,827,481 | B2 | 12/2004 | Yoshioka |
| 7,384,187 | B2 | 6/2008 | Blackburn et al. |
| 2006/0227654 | A1 * | 10/2006 | Blackburn et al. ............ 366/206 |

FOREIGN PATENT DOCUMENTS

| TW | 318183 | * | 9/2007 |
| TW | 322792 | * | 12/2007 |
| TW | 331985 | * | 5/2008 |
| TW | 332522 | * | 5/2008 |

* cited by examiner

*Primary Examiner* — Yogendra Gupta
*Assistant Examiner* — Ninh Le
(74) *Attorney, Agent, or Firm* — Wang Law Firm, Inc.; Li K. Wang (57) ABSTRACT

A covering structure of a mixer includes: a fixed ring connected to the head of a mixer; an upper ring; and a lower ring. The fixed ring is further surrounded by a protruding ring. The upper ring has a striding part on its inner wall to stride on the protruding ring. The upper ring further has at least two stopping parts at an interval. A concave part is formed between each pair of consecutive stopping parts. One end of the lower ring is formed with connecting parts whose number is the same as that of the stopping parts. Its other end is connected downward with a covering element. The connecting parts of the lower ring are inserted via the concave parts on the upper ring and above them. By rotating the lower ring, the connecting parts urge against the stopping parts to form a rotating ring that can rotate along the protruding ring.

7 Claims, 9 Drawing Sheets

COVERING STRUCTURE OF A MIXER

BACKGROUND OF THE INVENTION

1. Field of Invention

The invention relates to a mixer structure and, in particular, to a covering structure of a mixer.

2. Related Art

Figure 11:
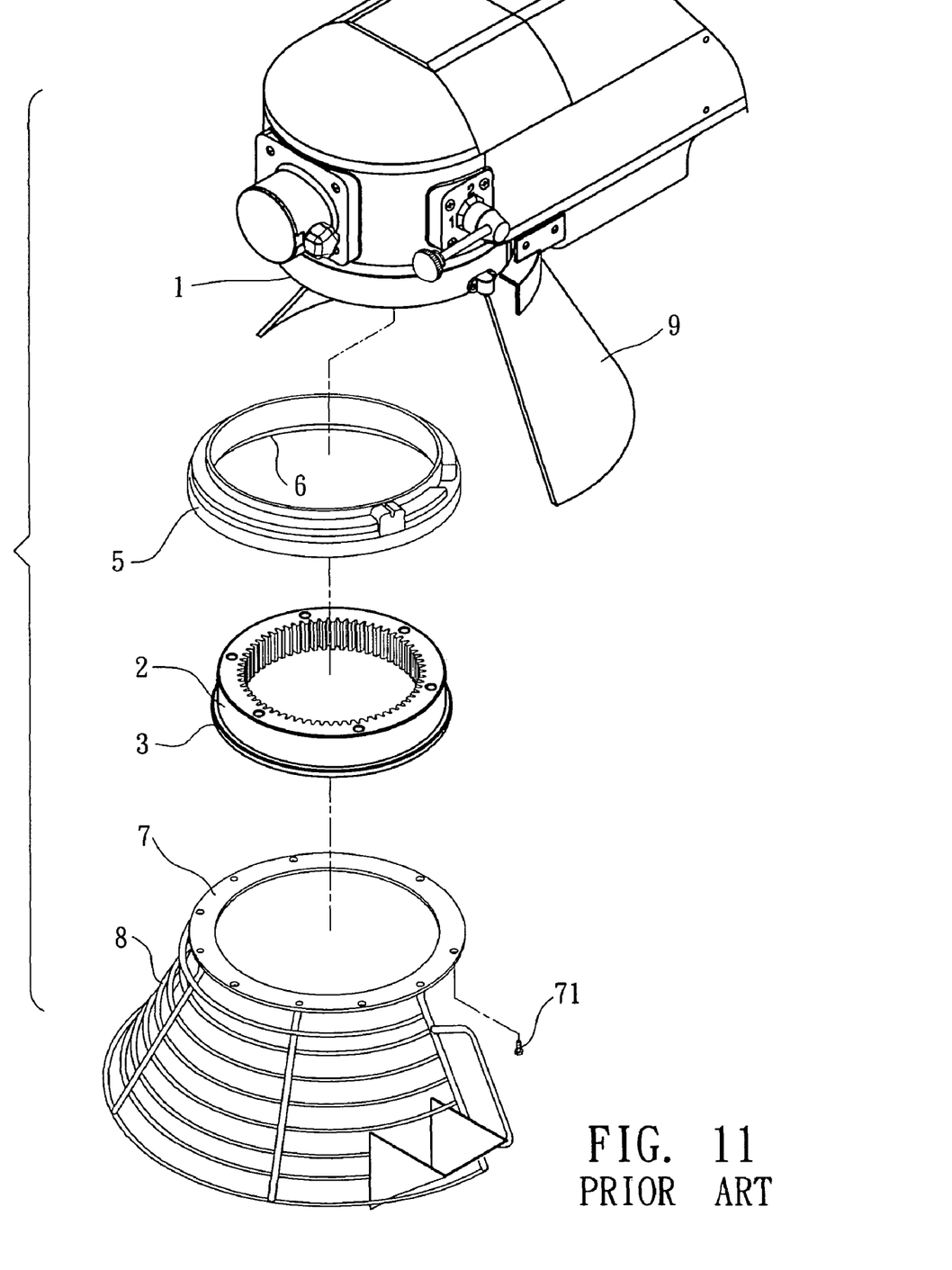
FIG. 11 is a schematic view of the conventional covering structure of a mixer.

As shown in FIG. 11, the conventional covering structure of a mixer has a fixed ring 2 fixed around the stirring bar at the bottom surface of the head 1 of the mixer. The lower section of the outer ring surface of the fixed ring 2 is extended with a protruding edge 3. A striding ring 6 protrudes from the top edge of the inner ring surface of a rotating ring 5. The rotating ring 5 is mounted on the upper surface of the protruding edge 3 using the lower surface of its striding ring 6. The bottom surface of the rotating ring 5 is fixed with a connecting ring 7. The lower part of the connecting ring 7 is further soldered with a protecting mesh 8. A protecting cover 9 is connected to the neck part of the mixer using its back. When the operator pushes or drags the protecting mesh 8 sideways, the rotating ring 5 rotates along the protruding edge 3 of the fixed ring 2. When the protecting mesh 8 rotates with the rotating ring 5 into the protecting cover 9, it is in an open position. On the other hand, when the protecting mesh 8 rotates out from the protecting cover 9, it is in a closed position.

However, in the above-mentioned covering structure of the mixer, the connecting ring 7 is fixed on the bottom surface of the rotating ring 5 using several screws 71. The connecting ring 7 thus can rotate with the rotating ring 5. In such a configuration, one needs to use hand tools to install or uninstall the connecting ring 7. This is very complicated and time-consuming. It is difficult for the user to uninstall the connecting ring 7 and the protecting mesh 8 for cleaning.

Moreover, the mixer produces vibrations. Therefore, when screws 71 are used to connect the covering structure on the connecting ring 7, they may become loose and fall into the food in the mixing buckle. This is very dangerous for consumers. Besides, the rotating ring 5 of the conventional mixer usually has a protruding part for triggering a safety switch. When the protecting mesh 8 of the mixer is in the closed position, the power of the mixer is on. However, after the connecting ring 7 is uninstalled, the rotating ring 5 is likely to be rotated and trigger the safety ring by mistake, resulting in the self-operation of the head of the mixer.

In view of this, the inventor of this invention comes up with a new idea based upon his many years of experience in the industry.

SUMMARY OF THE INVENTION

An objective of the invention is to provide a covering structure of a mixer that has a simple structure to be quickly assembled and disassembled. This is convenient for the user to clean.

Another objective of the invention is to provide a covering structure of a mixer that can be disassembled without using additional hand tools.

A further objective of the invention is to provide a covering structure of a mixer that has a power failure protection mechanism to ensure the safety of the user.

In accord with the above-mentioned objectives, the disclosed covering structure of a mixer includes a fixed ring, an upper ring, and a lower ring.

The fixed ring is connected to the head of a mixer. A protruding ring surrounds the outer wall of the fixed ring. The inner wall of the upper ring is formed with an extended striding part. The upper ring strides on the upper surface of the protruding ring using its striding part. At least two stopping parts protrude from the outer wall of the upper ring at intervals. A concave part is formed between each two consecutive stopping parts.

One end of the lower ring is formed with connecting parts protruding toward the center of the lower ring whose number is the same as that of the stopping parts. Its other end is connected downwards with a covering element. The connecting parts of the lower ring are inserted via the concave parts and become above them. By rotating the lower ring, the connecting parts urge against the upper surface of the stopping parts of the upper ring. The upper ring and the lower ring combine to form a rotating ring that can rotate along the upper surface of the protruding ring.

The upper ring has an upper arm extending outwards in the radial direction. The lower surface of the upper arm has an accommodating space that accommodates a positioning assembly composed of an elastic element, a positioning block, and stopping plate in sequence. The lower ring has a lower arm extended outwards in the radial direction. The upper surface of the lower arm is concavely formed with a positioning part that engages with the positioning assembly of the upper arm. When the positioning assembly of the upper arm and the positioning part of the lower arm engage with each other, the upper arm and the lower arm combine to form a rotating arm. It then rotates with the covering element connected with the lower ring.

Furthermore, one side of the head of the mixer is provided with a restricting assembly that performs a vertical reciprocal motion. The upper surface of the upper arm is concavely disposed with a restricting part corresponding to the restricting assembly. When the rotating arm is pushed so that the restricting assembly engages with the restricting part, the covering element connected to the lower ring moves to a closed position.

The lower ring is provided with a protruding block with a pushing face. When the covering element connected to the lower ring moves to the closed position, the pushing face of the protruding block pushes the power touch rod of a microswitch so that the mixer is turned on.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
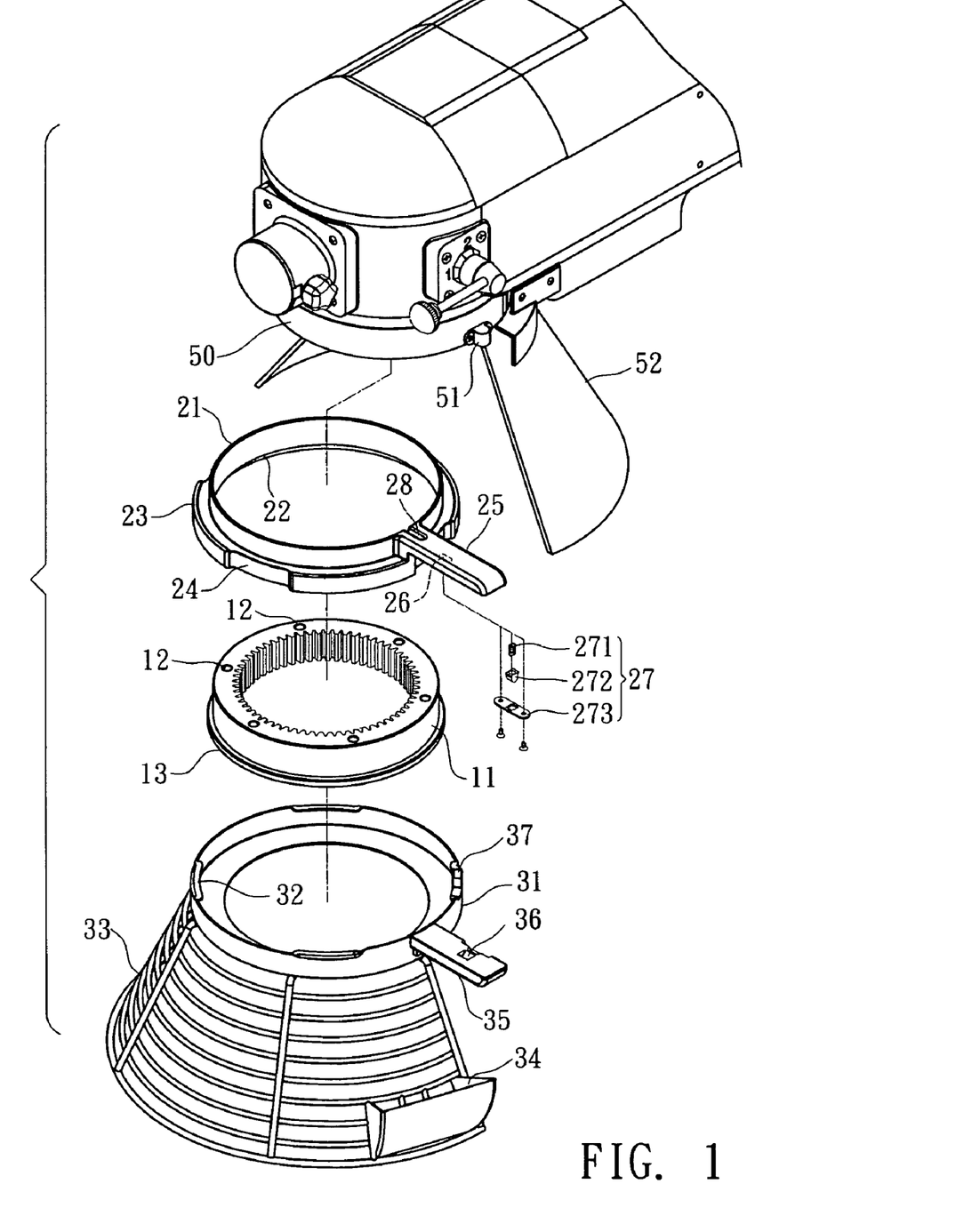
FIG. 1 is a three-dimensional exploded view of the invention.
Figure 2:
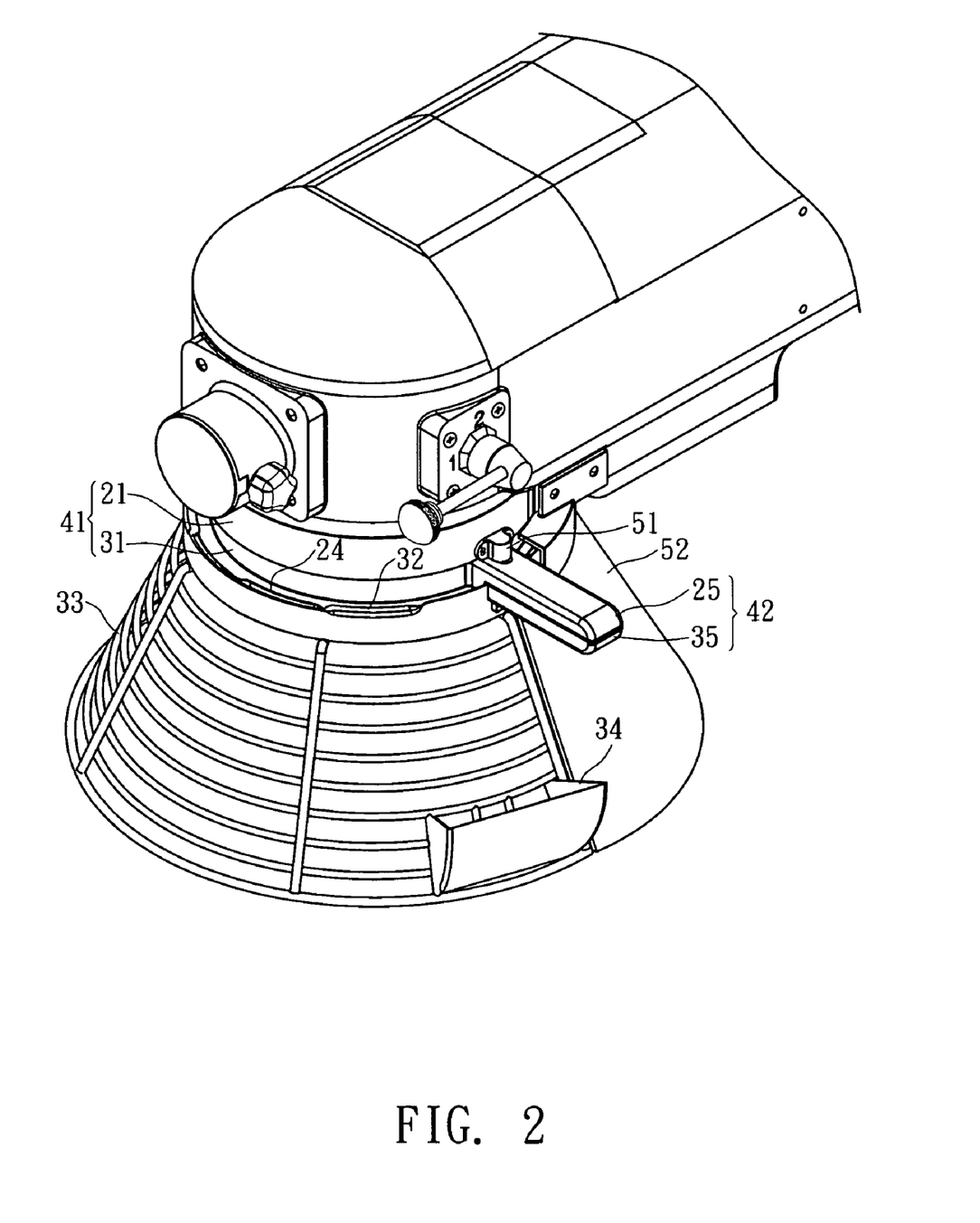
FIG. 2 is a schematic view of the assembled invention.

First, please refer to FIGS. 1 and 2. This embodiment of the invention is used only for the purpose of illustration. The invention is not restricted by this example.

The disclosed covering structure of a mixer includes a fixed ring 11, an upper ring 21, and a lower ring 31.

The fixed ring 11 has several through holes 12 formed at equal interval on its ring surface. A protruding ring 13 surrounds the outer wall of the fixed ring 11. A screw (not shown) goes through each of the through holes 12 from bottom to top, so that the fixed ring 11 can be fixed to the bottom surface of the head 50 of a mixer. One side of the head 50 is provided with a restricting assembly 51 that performs a vertical reciprocal motion. The peripheral of the head 50 is connected with a half umbrella-shaped protecting cover 52 extending downwards.

The upper ring 21 has an extended striding part 22 formed on its inner wall. The upper ring 21 strides on the upper surface of the protruding ring 13 using its striding part 22. At least two stopping parts 23 protrude from the outer wall of the upper ring 21 at equal interval. A concave part 24 is formed between each two consecutive stopping parts 23. The upper ring 21 has an upper arm 25 extended outwards in the radial direction. The lower surface of the upper arm 25 has an accommodating space 26. The accommodating space accommodates a positioning assembly 27 composed of an elastic element 271, a positioning block 272, and a stopping plate 273 in sequence. The upper surface of the upper arm 25 is concavely formed with a restricting part 28 corresponding to the restricting assembly 51 on one side of the head 50.

The lower ring 31 has connecting parts 32 formed on one end and extending toward its center. The number of the connecting parts 32 is the same as that of the stopping parts 23. The other end of the lower ring 31 is connected downwards with a half umbrella-shaped covering element 33. The covering element 33 and the half-umbrella-shaped protecting cover 52 are disposed correspondingly. In this embodiment, the covering element 33 is mesh made of stainless steel wires. It is further formed with a filling hole 34. Besides, the lower ring 31 further has a lower arm 35 extending outwards in the radial direction. The upper surface of the lower arm 35 is concavely formed with a positioning part 36 that can engage with the positioning assembly 27 on the upper arm 25 of the upper ring 21. The connecting parts 32 of the lower ring 31 are inserted from bottom to top via the concave parts 24 of the upper ring 21. Afterwards, the lower ring 31 is rotated so that the connecting parts 32 urge against the upper surface of the stopping parts 23 on the upper ring 21. Thus, they combine to form a rotating ring 41 that can rotate along the upper surface of the protruding ring 13. When the positioning assembly 27 of the upper arm 25 and the positioning part 36 of the lower arm 35 engage with each other, the upper arm 25 and the lower arm 35 combine to form a rotating arm 42. Using this method, one can push or pull the rotating arm 42 to rotate the covering element 33 connected to the lower ring 31.

Figure 3:
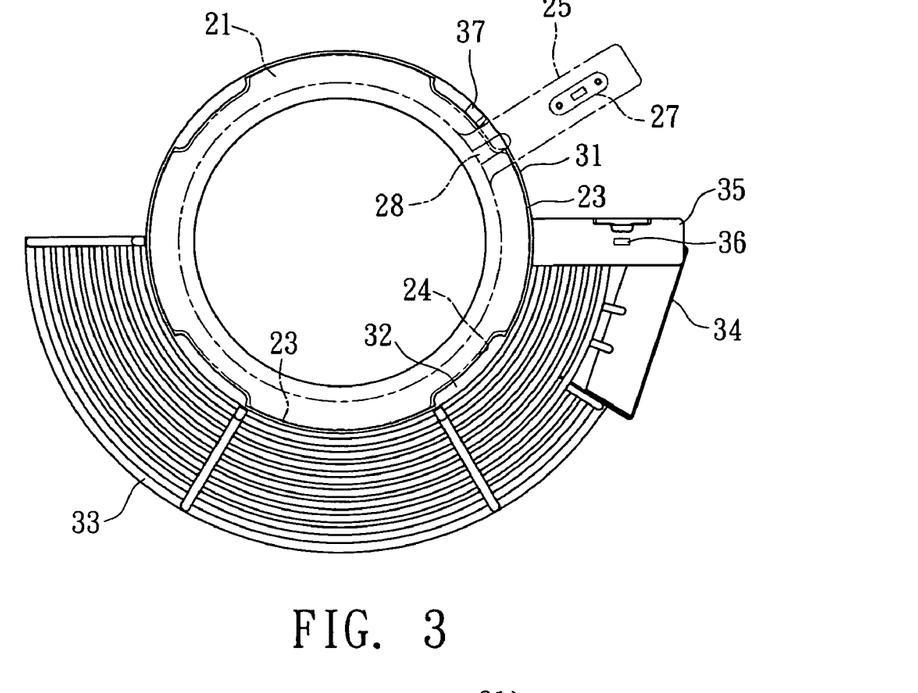
FIG. 3 is a schematic view of the invention in use, showing that the connecting parts on the lower ring are inserted via the concave parts on the upper ring and embedded into the upper ring.
Figure 4:
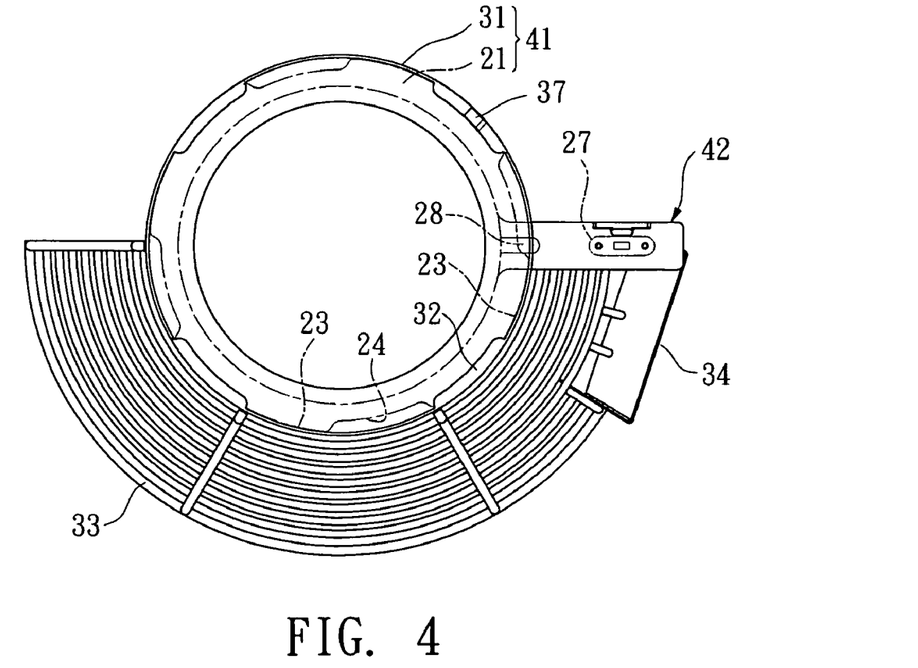
FIG. 4 is a schematic view of the invention in use, showing that the connecting parts on the lower ring rotates into the upper surface of the stopping parts on the upper ring.
Figure 5:
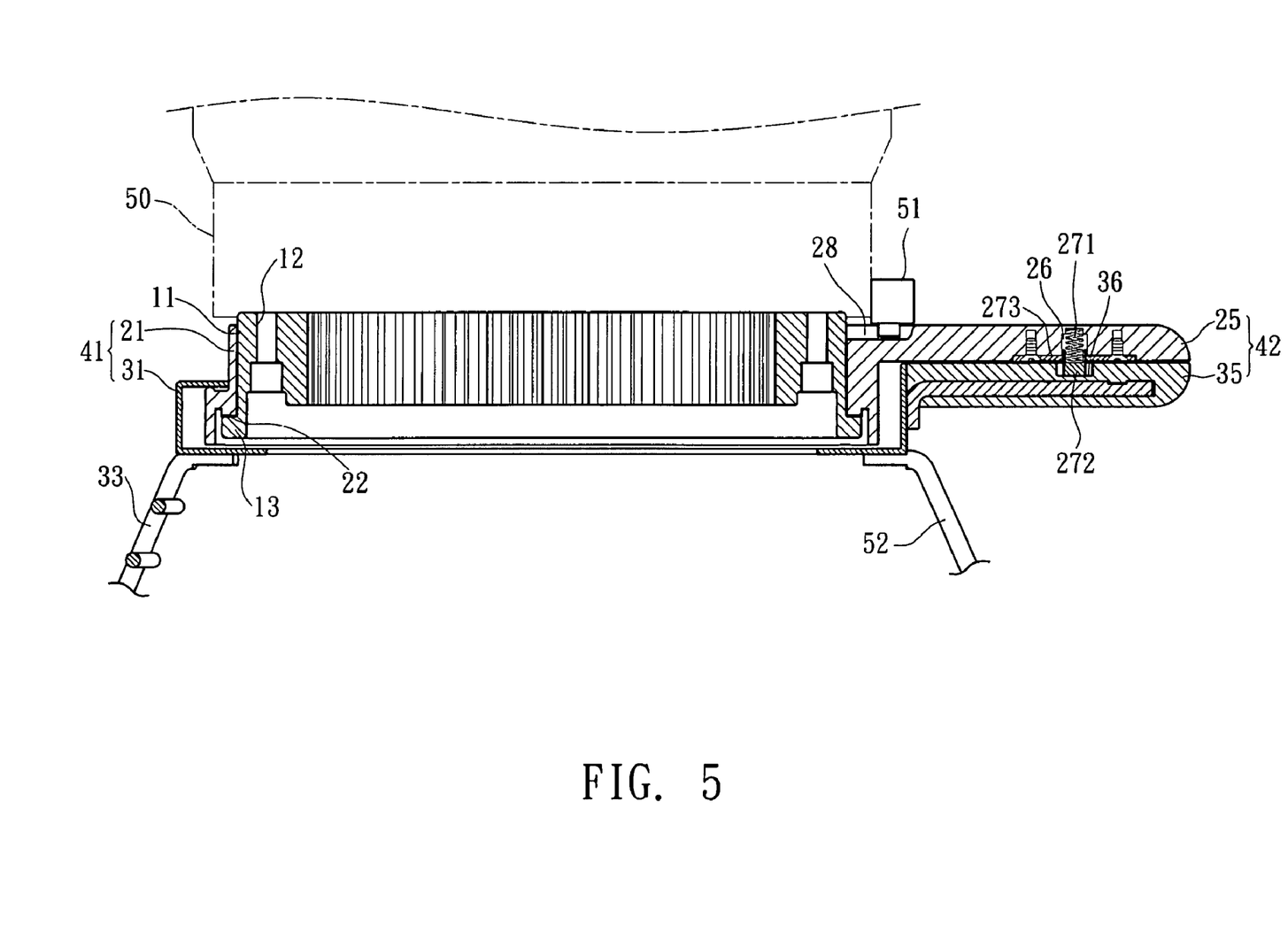
FIG. 5 is a cross-sectional view of the assembled invention.
Figure 6:
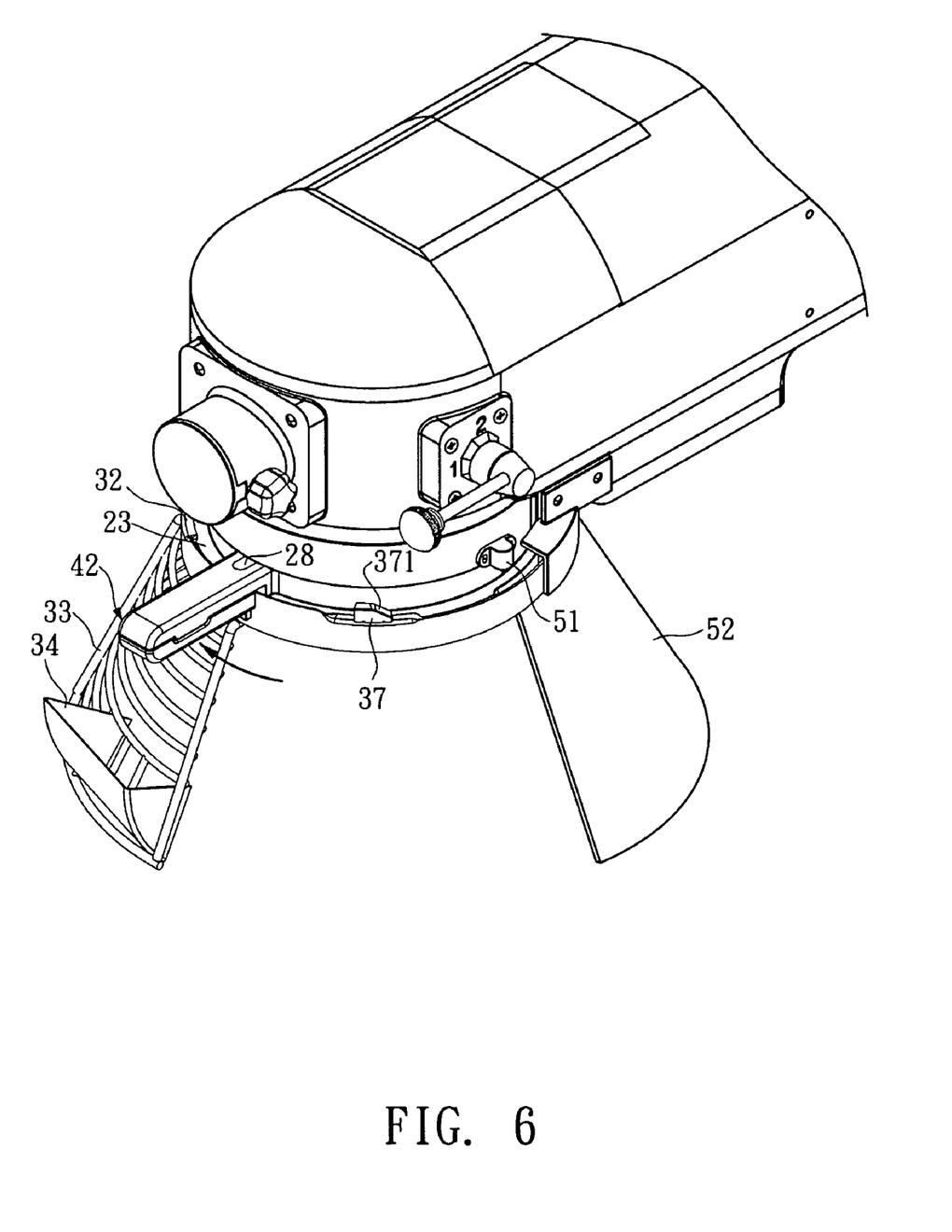
FIG. 6 is a schematic view of the invention in use, showing that the covering element rotates along with the rotating ring into the protecting cover, becoming an open position.

Please refer to FIG. 3. Since the outer diameter of the connecting parts 32 on the lower ring 31 is slightly smaller than the inner diameter of the concave parts 24 on the upper ring 21, the connecting parts 32 on the lower ring 31 can pass the concave parts 24 on the upper ring 21. As shown in FIG. 4, when the connecting parts 32 on the lower ring 31 rotate into the upper surface of the stopping parts 23 on the upper ring 21 so that the positioning assembly 27 of the upper arm 25 and the positioning part 36 of the lower arm 35 engage with each other, the connecting parts 32 on the lower ring 31 urge against the upper surface of the stopping parts 23 on the upper ring 21. As shown in FIG. 5, the fixed ring is fixed to the bottom surface of the head 50 and cannot move. Therefore, the rotating ring 41 composed of the upper ring 21 and the lower ring 31 can rotate along the surface of the protruding ring 13 on the fixed ring 11. As the covering element 33 rotates with the rotating ring 41 toward the protecting cover 52, the covering element 33 moves to an open position (FIG. 6). On the other hand, when the covering element 33 rotates out opposite to the protecting cover 52 so that the restricting assembly 51 of the head 50 and the restricting part 28 of the rotating arm 42 engage with each other, the covering element 33 on the lower ring 31 moves to a closed position (FIG. 2).

Using the above-mentioned structure, when the user wants to take down the covering element 33 for cleaning, he only needs to apply an opposite pushing force on the lower arm 35 and the upper arm 25, releasing the engaging state between the positioning assembly 27 of the upper arm 25 and the positioning part 36 of the lower arm 35. Afterwards, the user rotates the lower ring 31 so that its connecting parts rotate out of the upper surface of the stopping parts 23 on the upper ring 21. As a result, the connecting parts on the lower ring 31 escape from the concave parts 24 of the upper ring 21. The lower ring 31 and the upper ring 21 depart from each other for the user to clean.

Figure 7:
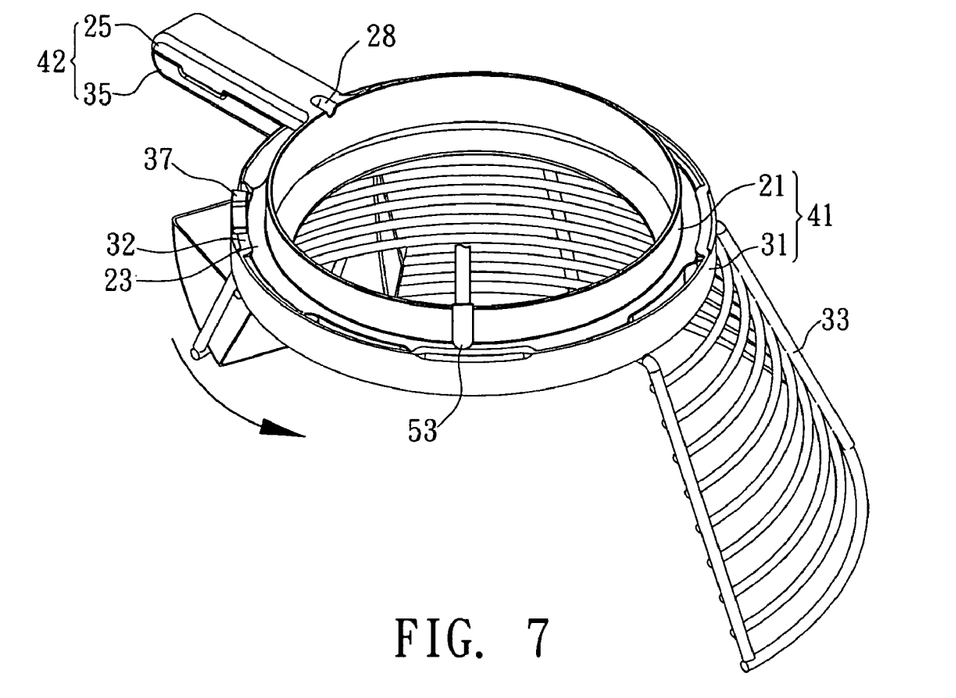
FIG. 7 is a schematic view of the invention in use, showing that the power touch rod departs from the protruding block on the lower ring to turn off the mixer.
Figure 8:
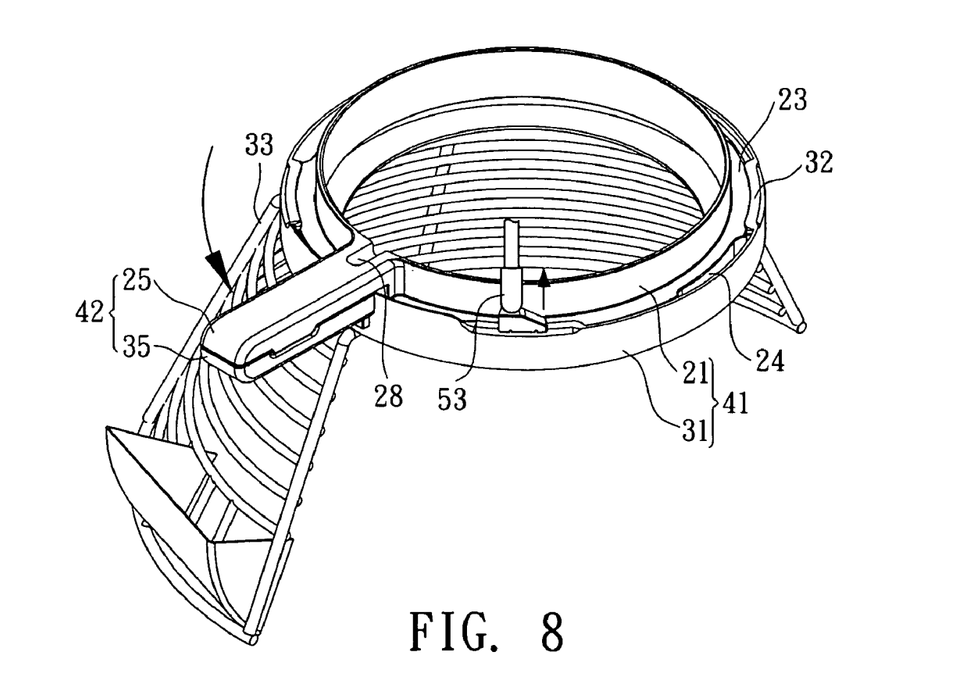
FIG. 8 is a schematic view of the invention in use, showing that the power touch rod is pushed by the pushing face of the protruding block on the lower ring to turn on the mixer.

Please refer to FIGS. 7 and 8. The lower ring 31 further has a protruding block 37 with a pushing face 371. Inside the mixer there is a touch rod 53 that can slide up and downs to control a microswitch (not shown) that controls the power of the mixer. The touch rod 53 can be pushed by the pushing face 371 of the protruding block 37 on the lower ring 31 to turn on the power of the mixer. When the covering element 33 is in the open position, the touch rod 53 is far from the protruding block 37 of the lower ring 31. The mixer is power off in this case (FIG. 7). On the other hand, when one rotates the rotating arm 42 to engage the restricting part 28 with the restricting assembly 51 on the head 50, the covering element 33 moves to the closed position. The touch rod 53 is then pushed by the pushing face 371 of the protruding block 37 on the lower ring 31 to turn on the power of the mixer for mixing (FIG. 8). The engaging effect between the restricting assembly 51 of the head 50 and the restricting part 28 of the rotating arm 42 can effectively ensure that the covering element 33 will not become loose and turn of the power due to vibrations when it is in the closed position.

Furthermore, when the engaging state between the upper arm 25 of the upper ring 21 and the lower arm 35 of the lower ring 31, and when the lower arm 35 rotates the lower ring 31 so that the protruding block 37 on the lower ring 31 urges against the side edge of the upper arm 25 of the upper ring 21, the connecting parts 32 of the lower ring 31 correspond to the concave parts 24 on the upper ring 21. Thus, the protruding block 37 further provides a restricting function for the user to assemble and disassemble the lower ring 31 in a quicker and more convenient way.

Figure 9:
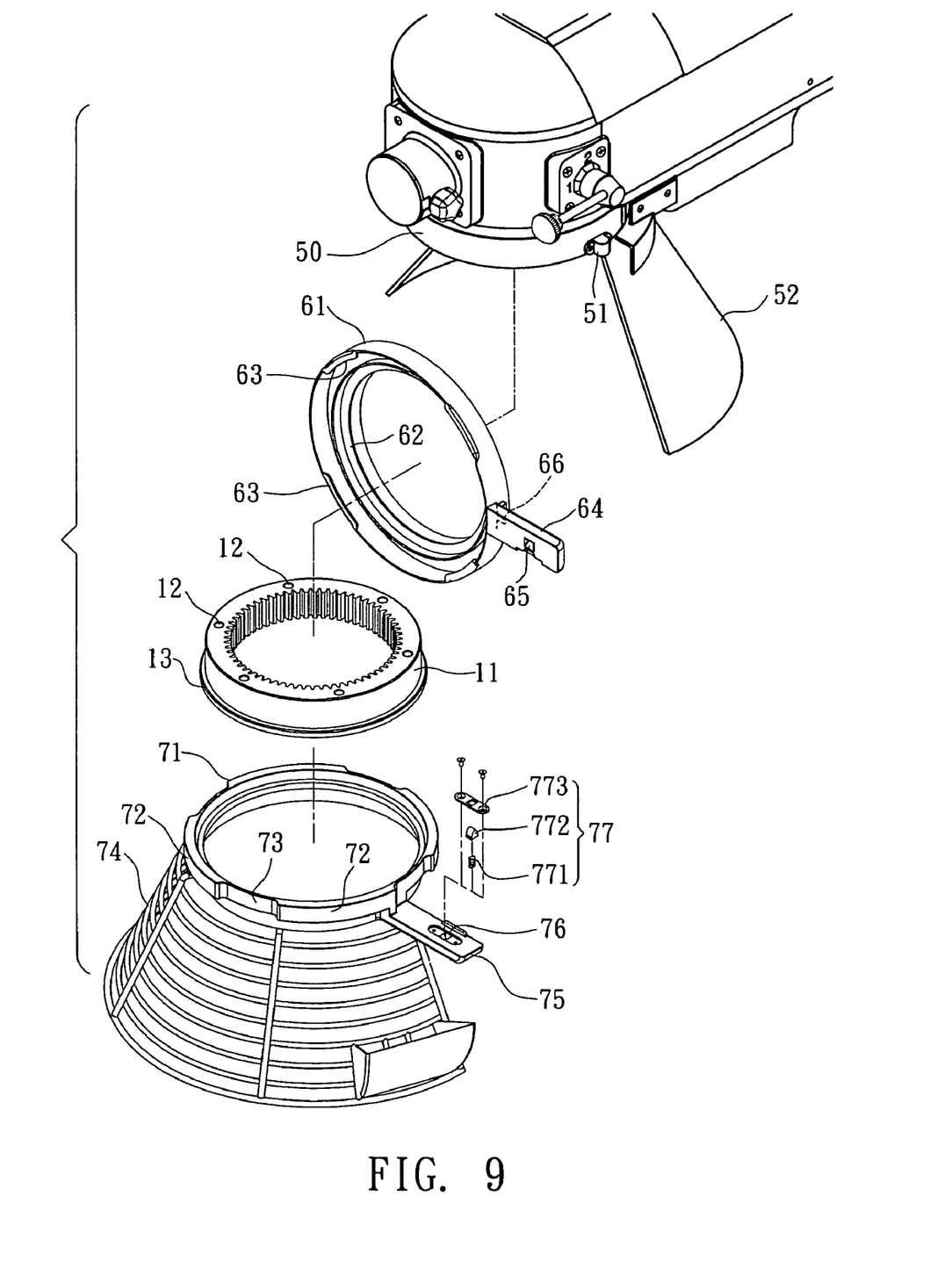
FIG. 9 is a three-dimensional exploded view of the second embodiment of the invention.
Figure 10:
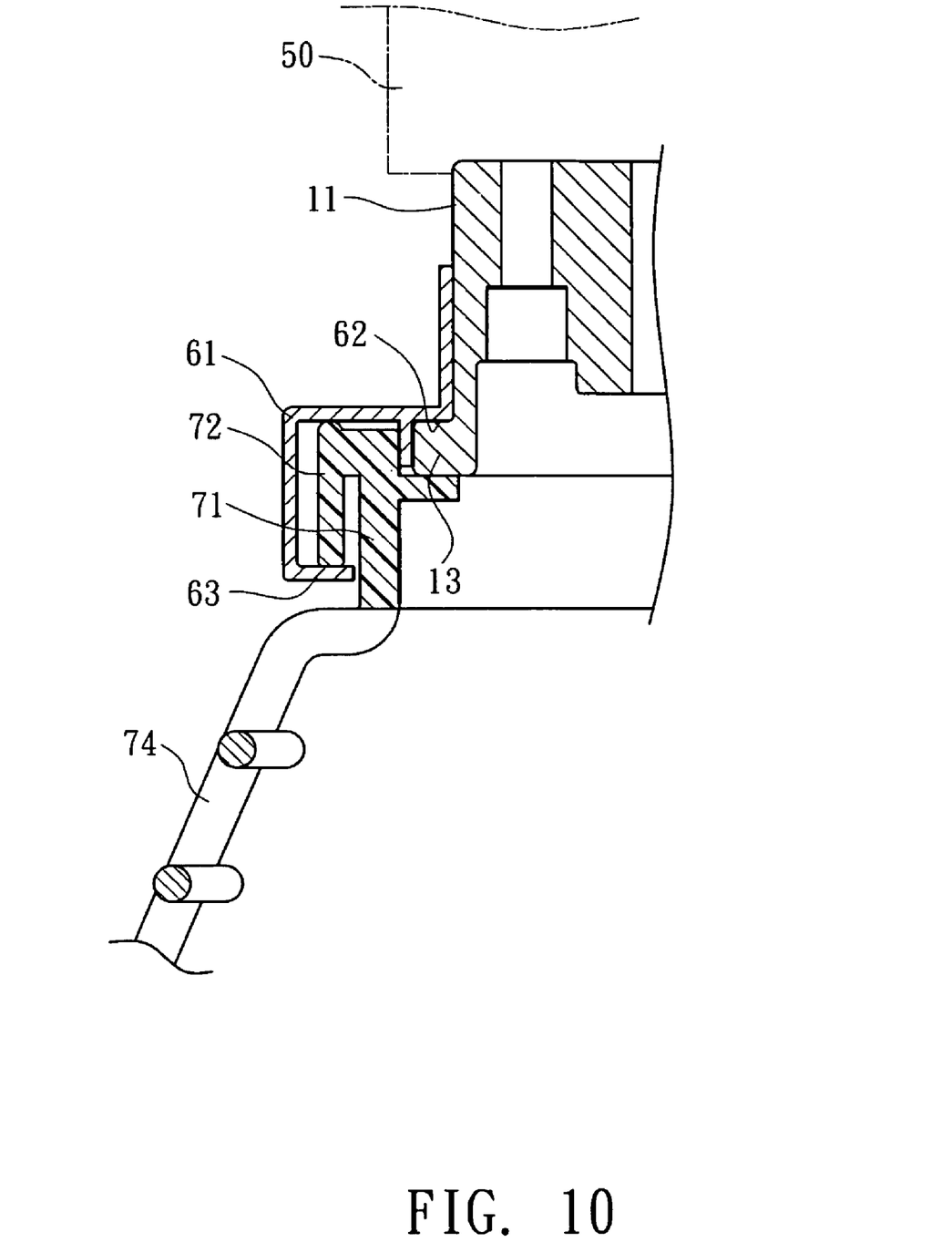
FIG. 10 is a cross-sectional view of the second embodiment after being assembled.

The invention, of course, has many other embodiments. FIGS. 9 and 10 show a second embodiment. The covering structure of a mixer has a fixed ring 11, an upper ring 61, and a lower ring 71.

The fixed ring 11 is connected to the head 50 of a mixer. A protruding ring 13 surrounds the outer wall of the fixed ring 11.

A striding part 62 is formed on the inner wall of one end of the upper ring 61. At least two connecting parts 63 at equal interval protrude from the other end of the upper ring 61 toward the center thereof. The upper ring 61 strides on the upper surface of the protruding ring 13 using its striding part 62.

The outer wall on one end of the lower ring 71 is protruded with stopping parts 72 in an equal number to the connecting parts 63. A concave part 73 is formed between each consecutive two stopping parts 72. The other end of the lower ring 71 is connected with a covering element 74. The concave parts 73 of the lower ring 71 are inserted via the connecting parts 63 of the upper ring 61 and become above the connecting parts 63. By rotating the lower ring 71, its stopping parts 72 urge against the upper surface of the connecting parts 63 of the upper ring 61. The upper and lower rings 61, 71 thus combine to form a rotating ring 81 that rotates along the upper surface of the protruding ring 13.

The upper ring 61 has an upper arm 64 extended outwards along the radial direction. The lower surface of the upper arm 64 is concavely formed with a positioning part 65. The lower ring 71 has a lower arm 75 extended outwards along the radial direction. The upper surface of the lower arm 75 is concavely formed with an accommodating space 76. The accommodating space 76 accommodates a positioning assembly 77 composed of an elastic element 771, a positioning block 772, and a stopping plate 773. The positioning assembly 77 can engage with the positioning part 65 on the upper arm 64. When the positioning part 65 of the upper arm 64 and the positioning assembly 77 of the lower arm 75 engage with each other, the upper arm 64 and the lower arm 75 combine to form a rotating arm 82. It rotates with the covering element 74 connected to the lower ring 71.

Moreover, one side of the head 50 of the mixer is provided with a restricting assembly 51 that performs a vertical reciprocal motion. The upper surface of the upper arm 64 is concavely formed with a restricting part 66 that can engage with the restricting assembly 51. When the rotating arm 82 is pushed so that the restricting assembly 51 and the restricting part 66 engage with each other, the covering element 74 connected to the lower ring 71 moves to a closed position.

Using the above-mentioned structure, this embodiment can also combine the upper and lower rings 61, 71 by embedding. It also achieves the feature of quick assembly and disassembly.

In summary, the covering structure of a mixer according to the invention has the following advantages:

1. The disclosed structure is simple. The lower ring 31 connects to the upper ring 21 by embedding. Therefore, it can be easily assembled or disassembled. The user can thus take off its parts by himself for cleaning.

2. The upper ring 21 in the invention strides on the protruding ring 13 of the fixed ring 11 using its striding part 22. Therefore, opening and closing the covering element can be performed by horizontally rotating the rotating arm. This is more convenient than the prior art.

3. The upper and lower rings 21, 31 are combined by embedding. The user can disassemble it by hand, without using additional hand tools. This is convenient for cleaning to satisfy food hygiene standards.

4. The upper and lower rings 21, 31 are combined by embedding without using fixing element such as screws. In addition to reducing costs, it avoids the problem of having loose elements due to vibrations of the running mixer. The consumers will not have fixing elements in food by mistake.

5. The disclosed mixer further has a power failure protection mechanism. When the covering element 33 is not completely in the closed position, the mixer is kept off. This ensures better safety for the user.

6. The engagement provided by the restricting assembly 51 of the head 50 and the restricting part 28 of the rotating arm 42 ensures that the covering element 33 is kept off during the operation of mixer. The covering element is not affected by the vibration of the machine to turn off the power.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A covering structure of a mixer, the mixer having a head, comprising: a fixed ring, with an outer wall and a protruding ring, connected to the head of the mixer and surrounded by the protruding ring on the outer wall, the protruding ring having an upper surface; an upper ring, with an outer wall, an inner wall and an extended striding part formed from the inner wall, the extended striding part strides on the upper surface of the protruding ring, and the outer wall of the upper ring has at least two stopping parts, each stopping part having an upper surface and a concave part is formed between two stopping parts; and a lower ring, with a first end and a second end, the first end is formed with connecting parts, the connecting parts extending toward the center of the lower ring, the second end of the lower ring is connected downwardly with a covering element; wherein each connecting part of the lower ring is inserted to be assembled via a bottom part of the concave part of the upper ring to the top part of the concave part, the connecting parts urge against the upper surface of the stopping parts, and the upper ring and the lower ring combine to form a rotating ring that rotates along the protruding ring.

2. The covering structure of a mixer of claim 1, wherein
the upper ring has an upper arm extending outwardly along the radial direction, the upper arm has a lower surface and upper surface,
the lower surface of the upper arm has an accommodating space that accommodates a positioning element composed of an elastic element, a positioning block, and a stopping plate in sequence,
the lower ring has a lower arm extending outwardly along the radial direction, the lower arm has an upper surface, the upper surface of the lower arm is formed concavely with a positioning part corresponding to the positioning element on the upper arm; and
when the positioning element on the upper arm engages the positioning part on the lower arm, the upper arm and the lower arm form a rotating arm for rotating a covering element connected to the lower ring.

3. The covering structure of a mixer of claim 2, wherein one side of the head of the mixer is provided with a restricting assembly that performs a vertical reciprocal motion, the upper surface of the upper arm is concavely formed with a restricting part that engages with the restricting assembly, and when the rotating arm is pushed, the restricting assembly engages the restricting part and the covering element connected to the lower ring is closed.

4. The covering structure of a mixer of claim 3, wherein the lower ring is provided with a protruding block with a urging face and when the covering element on the lower ring is closed, the urging face of the protruding block pushes a touch rod of a microswitch to turn on power to the mixer.

5. The covering structure of a mixer of claim 1, wherein the covering element has a half umbrella shape and the head of the mixer has a peripheral connected to a half umbrella-shaped cover that extends downwardly.

6. The covering structure of a mixer of claim 1, wherein the covering element further comprises a filling hole.

7. The covering structure of a mixer of claim 1, wherein the covering element further comprises a mesh made of stainless steel strings.

* * * * *